(12) United States Patent
Lee et al.

(10) Patent No.: US 10,192,284 B2
(45) Date of Patent: Jan. 29, 2019

(54) METHOD FOR MANAGING SURVEILLANCE SYSTEM WITH AID OF PANORAMIC MAP, AND ASSOCIATED APPARATUS

(71) Applicant: Synology Incorporated, Taipei (TW)

(72) Inventors: Szu-Hsien Lee, Taipei (TW); Bo-Shao Lin, Taipei (TW); His-Wei Chang, Changhua County (TW)

(73) Assignee: Synology Incorporated, Taipei (TW)

( * ) Notice: Subject to any disclaimer, the term of this patent is extended or adjusted under 35 U.S.C. 154(b) by 567 days.

(21) Appl. No.: 14/875,714

(22) Filed: Oct. 6, 2015

(65) Prior Publication Data

US 2016/0112629 A1   Apr. 21, 2016

(30) Foreign Application Priority Data

Oct. 21, 2014 (TW) .............................. 103136314 A

(51) Int. Cl.
| | |
|---|---|
| *G06T 3/00* | (2006.01) |
| *H04N 7/18* | (2006.01) |
| *H04N 5/232* | (2006.01) |
| *G06T 11/60* | (2006.01) |
| *G08B 13/196* | (2006.01) |

(52) U.S. Cl.
CPC ............ *G06T 3/0018* (2013.01); *G06T 11/60* (2013.01); *G08B 13/19628* (2013.01); *G08B 13/19689* (2013.01); *H04N 5/23238* (2013.01); *H04N 7/181* (2013.01); *H04N 7/183* (2013.01)

(58) Field of Classification Search
CPC .................................................... G06T 3/0018
See application file for complete search history.

(56) References Cited

U.S. PATENT DOCUMENTS

| 8,370,421 B2 | 2/2013 | Gennari |
| 2010/0134591 A1 | 6/2010 | Park |
| 2011/0102586 A1 | 5/2011 | Yang |
| 2012/0062695 A1 | 3/2012 | Sakaki |

(Continued)

FOREIGN PATENT DOCUMENTS

| CN | 101938636 A | 1/2011 |
| CN | 202587168 U | 12/2012 |

(Continued)

*Primary Examiner* — James M Pontius
(74) *Attorney, Agent, or Firm* — Stevens & Showalter, LLP

(57) ABSTRACT

A method for managing a surveillance system includes at least one camera equipped with capability of capturing direction adjustment, such as a Pan-Tilt-Zoom (PTZ) camera. The method includes the steps of: outputting a panoramic map to a display module of the surveillance system for being displayed on the display module; according to at least one user input of a user of the surveillance system, labeling a target patrol route of the surveillance system on the panoramic map correspondingly for the user to confirm the target patrol route; and applying at least one configuration corresponding to the target patrol route to the camera to cause capturing direction adjustment operations of the camera to correspond to the target patrol route. The panoramic map may include at least one multi-directional combination picture corresponding to the camera.

18 Claims, 14 Drawing Sheets

(56) References Cited

U.S. PATENT DOCUMENTS

| | | | |
|---|---|---|---|
| 2012/0098927 A1* | 4/2012 | Sablak | G08B 13/19604 |
| | | | 348/36 |
| 2013/0021433 A1* | 1/2013 | Belsarkar | H04N 7/181 |
| | | | 348/36 |
| 2013/0027556 A1 | 1/2013 | Clark | |

FOREIGN PATENT DOCUMENTS

| | | |
|---|---|---|
| CN | 101755457 B | 4/2013 |
| CN | 103106700 A | 5/2013 |
| EP | 2 046 040 B1 | 4/2012 |
| TW | 201138465 | 11/2011 |
| WO | 2013006822 A1 | 1/2013 |

* cited by examiner

METHOD FOR MANAGING SURVEILLANCE SYSTEM WITH AID OF PANORAMIC MAP, AND ASSOCIATED APPARATUS

BACKGROUND OF THE INVENTION

1. Field of the Invention

The present invention relates to setting cameras (e.g. pan-tilt-zoom (PTZ) cameras) that have the capability of capturing direction adjustment, and more particularly, to a method for managing a surveillance system and an associated apparatus.

2. Description of the Prior Art

According to the related art, when a user of a conventional digital surveillance system wants to modify settings of a specific pan-tilt-zoom (PTZ) camera in the conventional digital surveillance system, the user may encounter some problems which render them unable to finish the entire setting flow quickly. For example, the procedure of setting a series of preset positioning points is very long and complicated. Further, due to the setting functions provided by the conventional digital surveillance system, the user may have insufficient information when setting patrol routes, which makes the user unable to quickly and intuitively set a desired surveillance range.

The user is therefore forced to operate buttons representing up, down, left and/or right movements to control a direction of the PTZ camera in order to move the PTZ camera to a preset positioning point of various desired positioning points, and then must record this preset positioning point. The user usually has to rotate the PTZ camera to a specific location before setting a preset positioning point. If there is a total of four preset positioning points PA, PB, PC, and PD, the user must set the positions four times, i.e. the operation of setting a preset positioning point has to be performed four times. When setting patrol routes, the user is usually guided to decide an order of a plurality of positioning points (e.g. "Preset positioning point PA→Preset positioning point PB→Preset positioning point PC→Preset positioning point PD"; or "Preset positioning point PA→Preset positioning point PC→Preset positioning point PB→Preset positioning point PD"). The order of the series of preset positioning points will be utilized to represent the patrol route. In a case where there is a total of four preset positioning points PA, PB, PC, and PD that are selectable, the user can only utilize the names "PA, PB, PC and PD" of the preset positioning points to abstractly plan their order.

The procedure of setting the preset positioning points takes considerable time and effort, and it is difficult to know where the PTZ camera is going to shoot from according to the names "PA, PB, PC and PD". In a situation where the number of PTZ cameras is larger than one, the user is forced to repeatedly perform the same operation, which is inconvenient when setting routes for the conventional digital surveillance system.

Related art experimental methods to solve the abovementioned problem are not without side effects. For example, one experimental method performs image analysis to automatically generate patrol routes. Although this conventional method may automatically generate patrol routes without requiring manual operations, the patrol routes are generated depending on algorithms and are thus unreliable. Further, the user cannot set personal preferred patrol routes when this method is applied.

In view of the above, related art techniques cannot provide an appropriate service for users. Therefore, there is a need for a novel method which can improve the control of settings for a digital surveillance system.

SUMMARY OF THE INVENTION

An objective of the present invention is to provide a method for managing a surveillance system, and an associated apparatus, to solve the aforementioned problems.

Another objective of the present invention is to provide a method for managing a surveillance system and an associated apparatus that can assist a user to quickly and correctly set cameras with capability of capturing direction adjustment, such as pan-tilt-zoom (PTZ) cameras, and more particularly, to assist the user to quickly and correctly determine the latest configurations of the cameras, which raises the user experience.

Another objective of the present invention is to provide a method for managing a surveillance system and an associated apparatus that can save time for a user.

At least one preferred embodiment of the present invention proposes a method for managing a surveillance system. The surveillance system comprises at least one camera with capability of capturing direction adjustment. The method comprises: outputting a panoramic map to a display module of the surveillance system, for displaying the panoramic map on the display module; correspondingly labeling a target patrol route of the surveillance system on the panoramic map according to at least one user input of a user of the surveillance system for the user to confirm the target patrol route; and applying at least one configuration corresponding to the target patrol route to the camera, to make capturing direction adjustment operations of the camera correspond to the target patrol route.

In addition to the above method, the present invention also proposes an apparatus for managing a surveillance system. The surveillance system comprises at least one camera with a capability of capturing direction adjustment. The apparatus comprises at least a portion of the surveillance system, and comprises an interface circuit and a control circuit. The interface circuit is configured in a central control device in the surveillance system, and arranged to couple to the camera. The control circuit is coupled to the interface circuit and configured in the central control device, and arranged to control the central control device to output a panoramic map to a display module of the surveillance system, for displaying the panoramic map on the display module. The control circuit correspondingly labels a target patrol route of the surveillance system on the panoramic map according to at least one user input of a user of the surveillance system for the user to confirm the target patrol route. The control circuit applies at least one configuration corresponding to the target patrol route to the camera through the interface circuit, to make capturing direction adjustment operations of the camera correspond to the target patrol route.

One of the advantages provided by the present invention is that, compared with related arts, the method and apparatus of the present invention may assist the user to quickly and correctly determine the latest configuration of PTZ cameras. This saves time for the user, and improves the user experience. Further, the method and apparatus of the present invention may generate the panoramic map in advance, to provide a panoramic patrol route plan interface which allows the user to plan patrol routes on the panoramic map. Specifically, based on the panoramic patrol route plan interface, the user may set or adjust the target patrol routes on the panoramic map, and preview a captured image corresponding to a specific target point on the panoramic map. Hence, the user may quickly and intuitively set a desired surveillance range.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
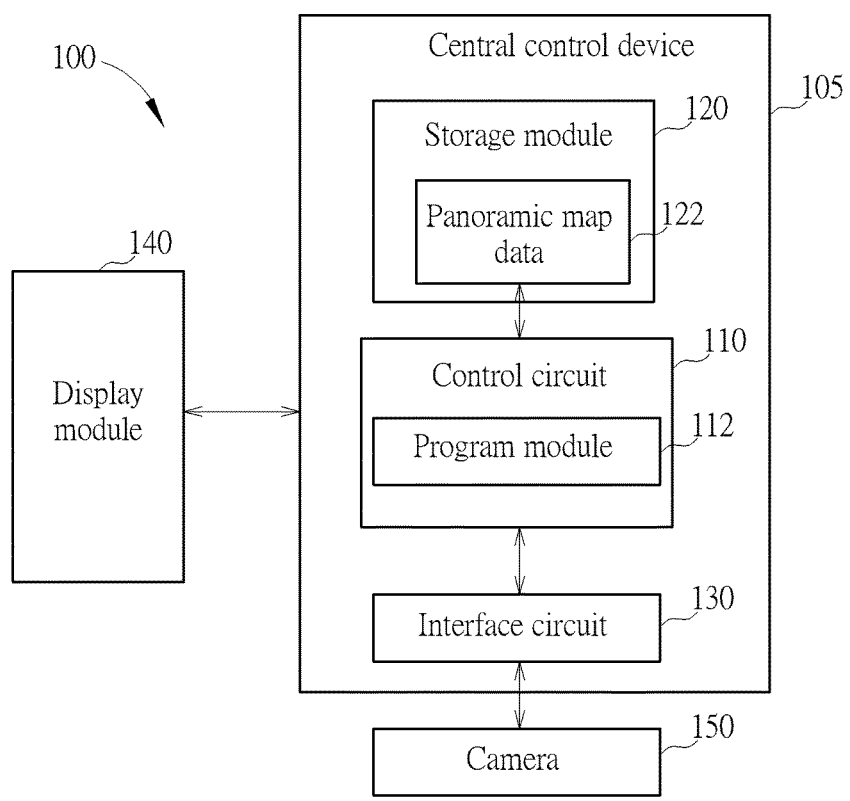
FIG. 1 is a diagram illustrating an apparatus for managing a surveillance system according to an embodiment of the present invention.

FIG. 1 is an apparatus 100 for managing a surveillance system according to an embodiment of the present invention, wherein the surveillance system includes at least one camera with capability of capturing direction adjustment, such as a pan-tilt-zoom (PTZ) camera, and the apparatus 100 may include at least a portion (e.g. part or all) of the surveillance system.

The camera 150 shown in FIG. 1 may represent the aforementioned at least one camera, such as the aforementioned one or multiple PTZ camera. According to this embodiment, each PTZ camera may store one or multiple designated configurations, and may refer to the designated configurations to automatically perform any of the operations of panning, tilting and zooming or various combinations of these operations. The designated configurations may be updated, and the capturing direction adjustment operation and the zooming operation of this PTZ camera can be changed accordingly. For example, when the apparatus 100 applies at least one (i.e. one or multiple) predetermined configuration to the camera such as the PTZ camera, so that the camera may automatically refer to the predetermined configuration, to perform any of the operations of panning, tilting and zooming, or various combinations of these operations.

As shown in FIG. 1, the apparatus 100 may include a central control device 105, and the central control device 105 includes a control circuit 110, a storage module 120 and an interface circuit 130. The control circuit 110 in this embodiment may include one or multiple program modules arranged to control the operations of the apparatus 100, wherein the program module 112 shown in FIG. 1 may represent the one or multiple program modules. For example, the program modules may be firmware modules. This is merely for illustrative purposes, and not meant to be limitations of the present invention. The aforementioned one or multiple program module can be software modules. In another example, the program modules may be implemented as modules inside an integrated circuit (IC). In practice, the control circuit 110 may be implemented with a micro control unit (MCU) or a microcontroller. Further, the storage module 120 in this embodiment may be used to store the panoramic map data 122 and is configured outside the control circuit 110, wherein the control circuit 110 is coupled to the interface circuit 130 and the storage module 120 is coupled to the control circuit 110. According to some embodiments, the storage module 120 may be integrated in the control circuit 110.

In this embodiment, the interface circuit 130 is utilized to couple to the camera, i.e. the camera 150 shown in FIG. 1. Further, the control circuit 110 may generate the panoramic map data 122, and may also update the panoramic map data 122, wherein the panoramic map data 122 may include data of at least one panoramic map (e.g. one or multiple panoramic maps), and the panoramic map may correspond to the camera. For example, the control circuit 110 may generate converted images by performing coordinate conversion upon the images captured by the camera in various directions, and may combine the converted images to generate the panoramic map. The implementation details associated with generating the panoramic map may be known by referring to various schemes proposed by related arts, and thus are omitted here for brevity.

Figure 2:
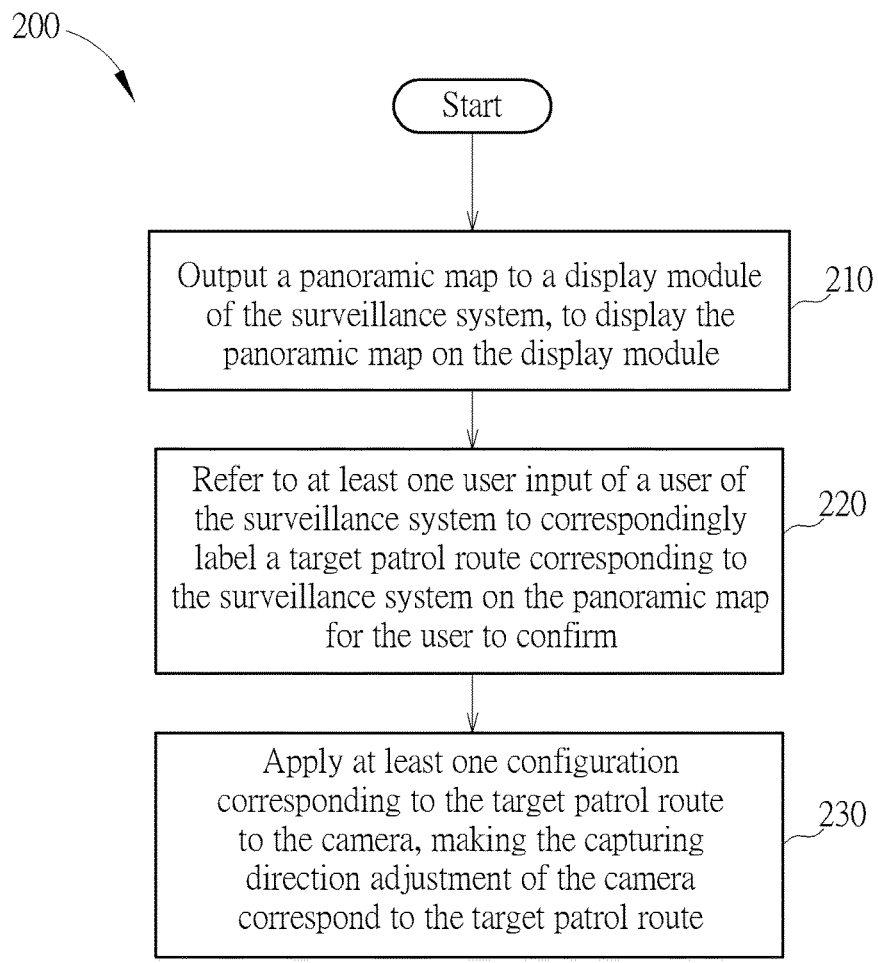
FIG. 2 is a flow chart illustrating a method for managing a surveillance system according to an embodiment of the present invention.

FIG. 2 is a flow chart illustrating a method 200 for managing a surveillance system according to an embodiment of the present invention. The method 200 may be applied to the apparatus 100 shown in FIG. 1, and may be applied to the aforementioned central control device 105, and more particularly, to the control circuit 110 therein. For example, step 210 may be performed after the control circuit 110 generates the panoramic map in advance. This is merely for illustrative purposes, and not meant to be limitations of the present invention. The method 200 is described as follows.

In step 210, the control circuit 110 controls the central control device 105 to output a panoramic map to a display module 140 of the surveillance system, in order to display this panoramic map on the display module 140. For example, the panoramic map may include at least one multi-directional combination picture corresponding to the camera. According to some embodiments, the panoramic map may include at least one fish eye diagram.

It should be noted that the panoramic map in step 210 may be viewed as an example of the aforementioned at least one panoramic map. Further, the display module 140 may be a liquid crystal display (LCD) module. For example, the display module 140 may be a touch sensitive display module, such as a touch screen.

In step 220, the control circuit 110 refers to at least one user input of a user of the surveillance system, to correspondingly label a target patrol route corresponding to the surveillance system on the panoramic map for the user to confirm.

In step 230, the control circuit 110 utilizes the interface circuit 130 to apply at least one configuration corresponding to the target patrol route to the camera, making the capturing direction adjustment of the camera correspond to the target patrol route. For example, the control circuit 110 may utilize the interface circuit 130 to apply the configuration to the camera, making the camera automatically perform patrol operations (such as the capturing direction adjustment operation) to obtain a series of image corresponding to the target patrol route image.

According to some embodiments, the control circuit 110 may refer to a specific user input (e.g. one of the aforementioned at least one user input), to instantly control a specific camera (e.g. one of the aforementioned at least one camera) to face a specific direction so that the user can confirm the target patrol route. For example, according to the specific user input, the control circuit 110 may also directly convert apart of the panoramic map into a picture having a view of the specific direction.

Specifically, the control circuit 110 may refer to the specific user input to instantly label a specific target point on the panoramic map, wherein the specific direction and the specific target point correspond to each other. The control circuit 110 may obtain at least one image corresponding to the specific direction from the specific camera through the interface circuit 130, and control the central control device 105 to output the aforementioned at least one image to the display module 140, to display the image on the display module 140 and allow the user to refer to the image to adjust the target patrol route. According to the specific user input and/or the specific target point, the control circuit 110 may also directly convert a portion of the panoramic map into a picture with the view of the specific direction.

For example, the specific target point may be generated by dragging an original target point on a temporary version of the target patrol route, wherein the control circuit 110 may instantly adjust the shape of the target patrol route on the panoramic map according to the specific user input, so that an updated version of the target patrol route includes the specific target point. In another example, the specific target point may be added outside a temporary version of the target patrol route, wherein the control circuit 110 may refer to the specific user input to instantly extend the target patrol route on the panoramic map, so that an updated version of the target patrol route includes the specific target point.

According to some embodiments, the control circuit 110 may generate the panoramic map in advance, and store the panoramic map into a storage module of the surveillance system. Specifically, the control circuit 110 may control the aforementioned camera to automatically perform a patrol operation corresponding to a plurality of directions through the interface circuit 130, to obtain a plurality of images corresponding to the plurality of directions. Further, the control circuit 110 may perform coordinate conversion upon the plurality of images, to generate a plurality of converted images corresponding to the plurality of images. The control circuit 110 may refer to locations corresponding to the plurality of directions on the panoramic map, to combine the plurality of converted images to generate the panoramic map.

As mentioned above, the control circuit 110 may refer to the specific user input in the user input, to control the specific camera in the camera to instantly face the specific direction through the interface circuit 130, so the user can confirm the target patrol route. This is merely for illustrative purposes, and not meant to be a limitation of the present invention. According to some embodiments, the control circuit 110 may refer to the specific user input to convert a partial image in the panoramic map into a simulated image so the user can confirm the target patrol route, wherein the simulated image simulates the image captured by the specific camera when the specific camera faces the specific direction.

According to some embodiments, under control of the control circuit 110, each of the aforementioned multi-directional combination pictures emulates at least a portion of a fisheye diagram. For example, the panoramic map data 122 may include the data of the panoramic map in step 210, such as the data of the panoramic map corresponding to a camera (e.g. a PTZ camera). Specifically, the panoramic map data 122 may further include data of a target patrol route of the camera. According to some embodiments, the camera may include a plurality of cameras (e.g. a plurality of PTZ cameras), and the multi-directional combination picture may include a plurality of multi-directional combination pictures corresponding to the plurality of cameras. Further, under the control of the control circuit 110, the panoramic map emulates a combination of a plurality of fish eye diagrams. For example, the panoramic map data 122 may include the data of the panoramic map illustrated in step 210, such as the data of a plurality of partial panoramic maps corresponding to the plurality of cameras, wherein the panoramic map may include one or multiple combinations of the plurality of partial panoramic maps. Specifically, the panoramic map data 122 may further include the data of at least one target patrol route of the plurality of cameras. According to some embodiments, the panoramic map may include at least one fish eye diagram corresponding to the camera, such as a fish eye diagram corresponding to the camera (e.g. a PTZ camera), or a plurality of fish eye diagrams corresponding to the plurality of cameras (e.g. a plurality of PTZ cameras). Note that the fish eye diagram is captured by utilizing at least one fish eye camera (e.g. one or multiple fish eye cameras).

According to the method 200 shown in FIG. 2 and a corresponding structure, such as the apparatus 100 shown in FIG. 1, the user may quickly and easily operate various settings. For example, the user may perform quick operations by using a mouse or a touch panel. Further, based on the method 200 shown in FIG. 2 and the corresponding structure, the panoramic map, the target patrol route and the camera labeled on the panoramic map can all be clearly seen. Hence, the user may intuitively set the target points, and readily control the settings of the target patrol route.

Figure 3:
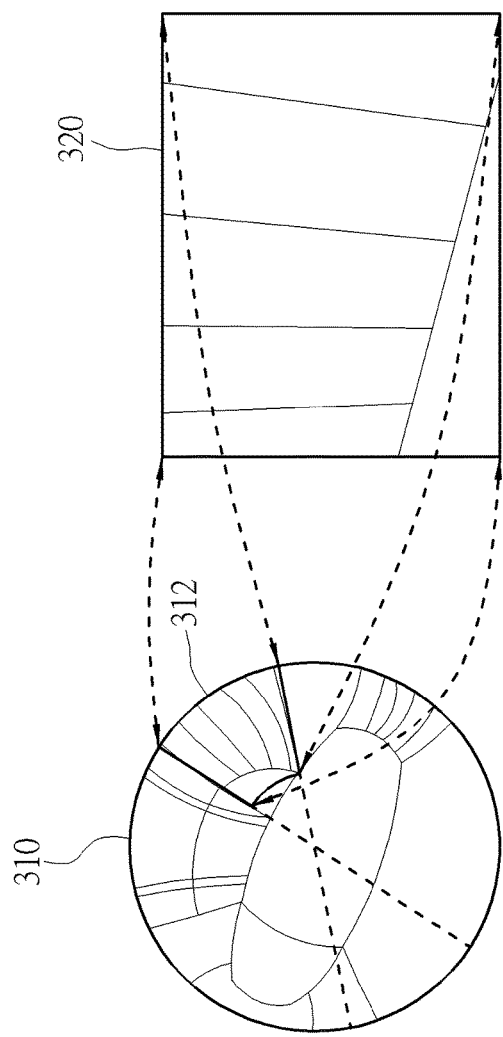
FIG. 3 is a diagram illustrating a scheme for generating a panoramic map performed by the method shown in FIG. 2 in an embodiment.

FIG. 3 is a diagram illustrating a scheme for generating a panoramic map performed by the method 200 shown in FIG. 2. In this embodiment, the control circuit 110 may use the camera 150 to perform coordinate conversion upon the image 320 to generate a converted image 312, and utilize the converted image 312 as a portion of the panoramic map 310. For example, the coordinate conversion may include mapping the image captured by a normal lens to a small portion of a wide-angle lens, and correspondingly adjusting the shape of the image to emulate a corresponding partial image of the image captured by the fish eye. Hence, the control circuit 110 may utilize the camera 150 to obtain images corresponding to different capturing directions, and may perform similar coordination conversions upon these images to generate a set of converted images, and combine this set of converted images to generate the panoramic map 310. Since combining the coordinate converted images to generate the panoramic map 310 is well known in the field, the detailed descriptions thereof are omitted here for brevity.

Figure 4:
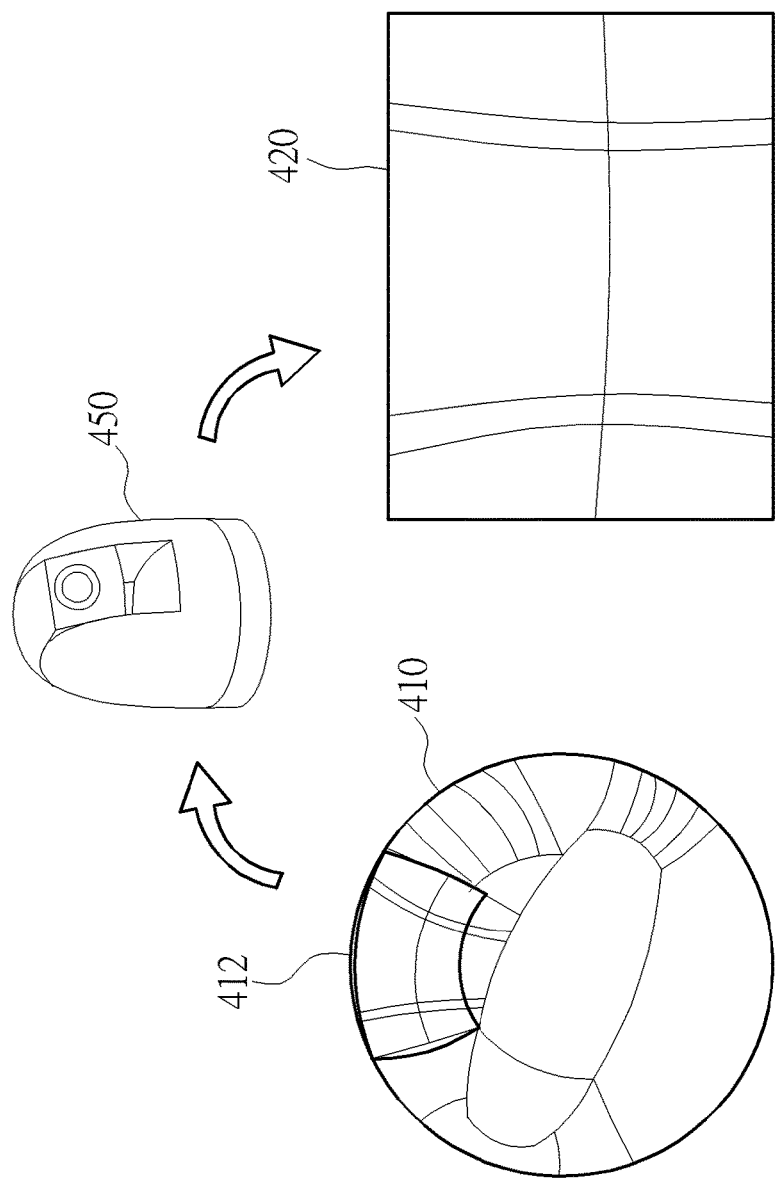
FIG. 4 is a diagram illustrating a camera control scheme performed by the method shown in FIG. 2 in an embodiment.

FIG. 4 is a diagram illustrating a camera control scheme performed by the method 200 shown in FIG. 2 in an embodiment, wherein the camera 450 may be an example of the camera 150. According to this embodiment, the control circuit 110 may control the central control device 105 to output a panoramic map 410 and a specific symbol 412 (e.g. a red frame arranged to surround a portion of the panoramic map 410), to assist the user to select a local area on the panoramic map 410 as a user defined area. Under the control of the control circuit 110, the central control device 105 allows the user to drag the specific symbol 412 to change the corresponding position of the specific symbol 412 on the panoramic map 410, and instantly control the camera 450 to automatically rotate to a corresponding direction via panning and/or tilting (for example) to obtain the latest image (i.e. an actual image rather than a converted image). Further, the latest image can be used as the normal image 420. According to the corresponding position of the specific symbol 412 on the panoramic map 410, the control circuit 110 may also directly convert a portion of the panoramic map 410 (e.g. the portion surrounded by the red frame) into an image viewing the same direction, and utilize the image as the normal image 420.

Although all the video objects on the panoramic map 410 are distorted, all the video objects on the normal image 420 are normal. Hence, regardless of whether the image 420 is an actual image or a coordinate converted image, the user may refer to the normal image 420 to determine whether the current capturing direction of the camera 450 is appropriate. The user may refer to the normal image 420 to select the user defined area on the panoramic map 410.

Figure 5:
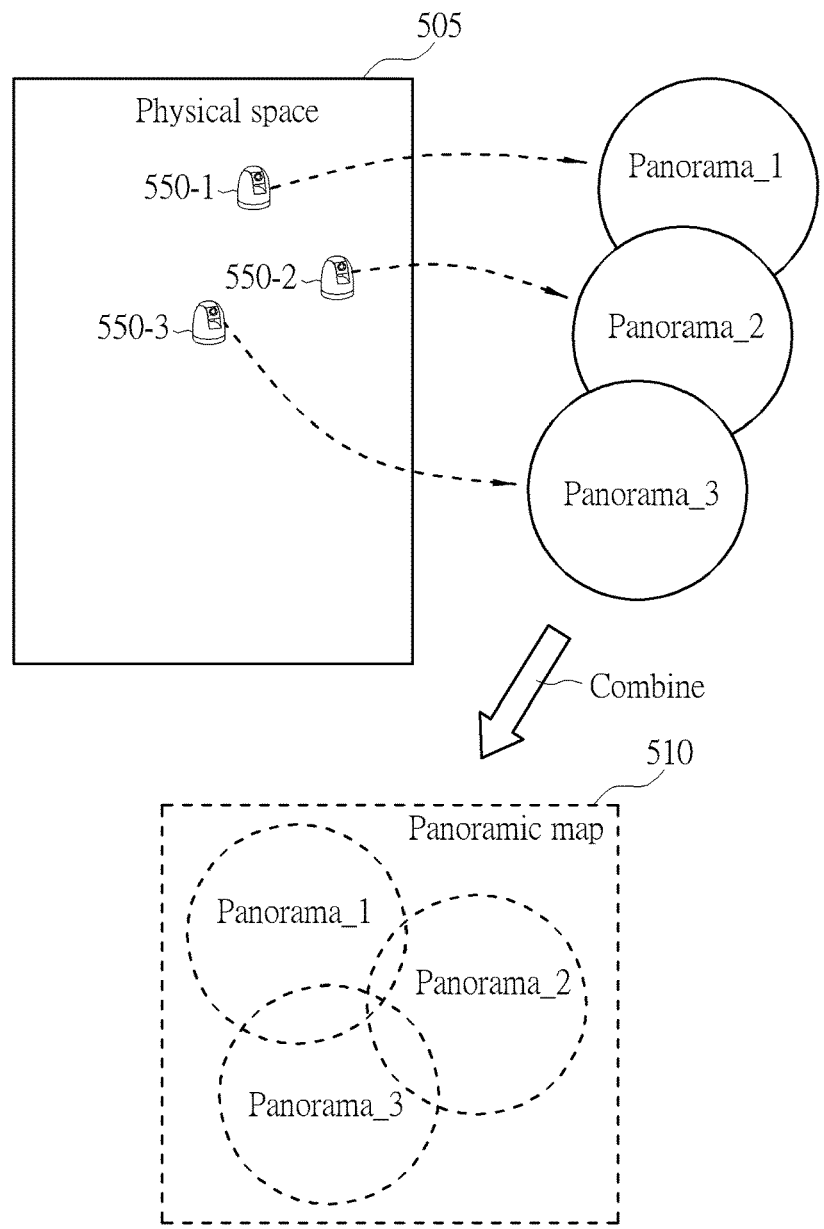
FIG. 5 is a diagram illustrating a scheme for generating a panoramic map performed by the method shown in FIG. 2 in another embodiment.

FIG. 5 is a diagram illustrating a scheme for generating a panoramic map performed by the method 200 shown in FIG. 2. According to this embodiment, the camera 150 may include three cameras 550-1, 550-2, and 550-3 (e.g. three PTZ cameras), and the control circuit 110 may refer to the panoramic map generation scheme shown in FIG. 3 to generate the panoramic maps Panorama_1, Panorama_2, and Panorama_3 corresponding to the cameras 550-1, 550-2, and 550-3. Specifically, the control circuit 110 may refer to relative positions of the cameras 550-1, 550-2, and 550-3 in the to combine the panoramic maps Panorama_1, Panorama_2, and Panorama_3 in order to generate the panoramic map 510. For example, regarding overlapped areas formed of any two of the panoramic maps Panorama_1, Panorama_2, and Panorama_3, the control circuit 110 may select one of these two panoramic maps as the contents of the overlapped area. In another example, regarding the areas overlapped by any two of the panoramic maps Panorama_1, Panorama_2, and Panorama_3, the control circuit 110 may respectively select apart of the two panoramic maps to represent the contents of the overlapped area. The three panoramic maps Panorama_1, Panorama_2, and Panorama_3 are local maps of the panoramic map 510, and may be called partial panoramic maps in this embodiment.

Figure 6:
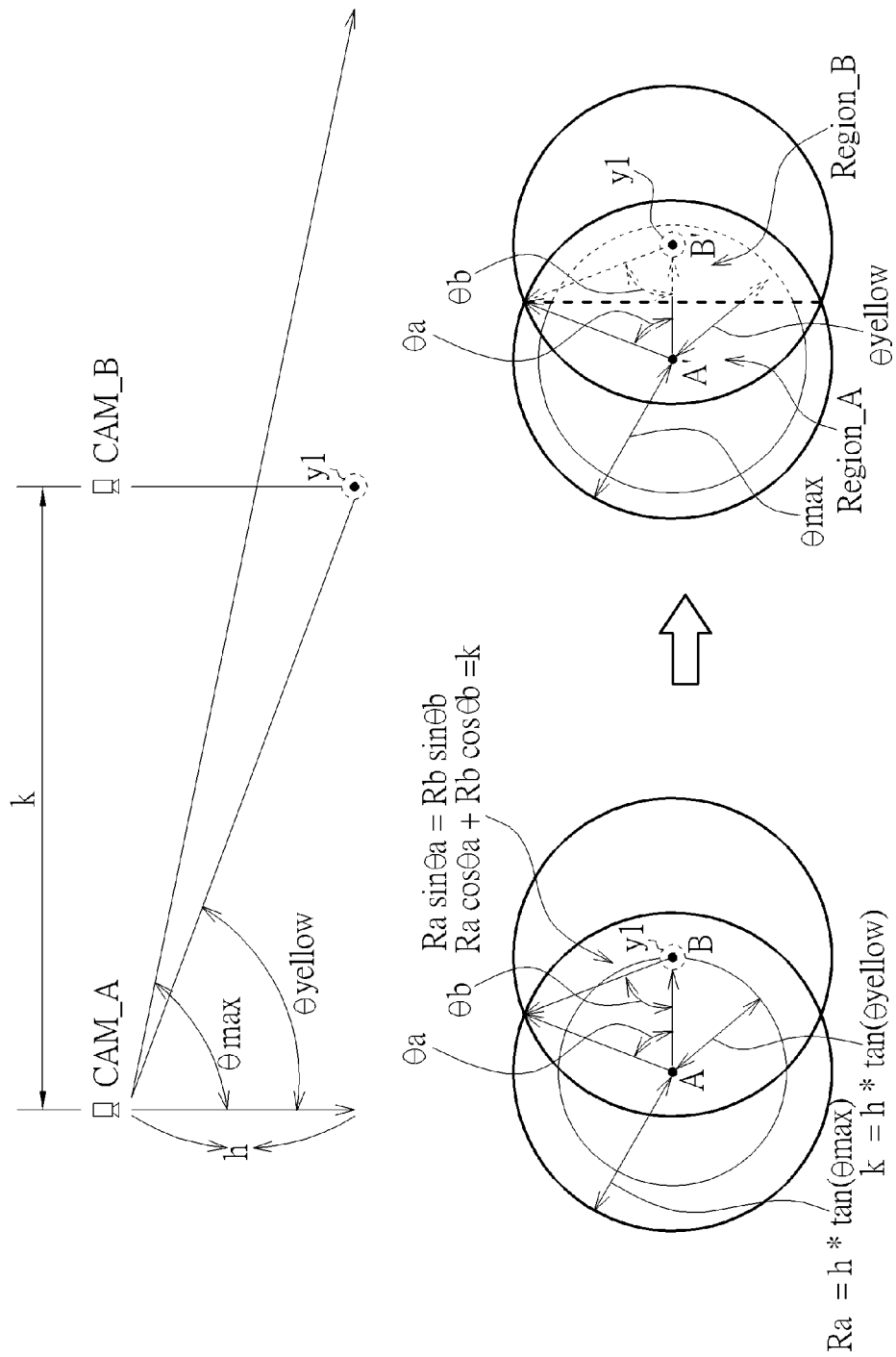
FIG. 6 is a diagram illustrating a panoramic map combining method performed by the method shown in FIG. 2 in another embodiment.

FIG. 6 is a diagram illustrating a panoramic map combining method performed by the method 200 shown in FIG. 2 in another embodiment. According to this embodiment, the control circuit 110 may utilize the panoramic map combining method to combine any two of the panoramic maps Panorama_1, Panorama_2, and Panorama_3, such as the panoramic maps Panorama_A and Panorama_B. For example, the panoramic map Panorama_A may represent a specific panoramic map within the panoramic maps Panorama_1, Panorama_2, and Panorama_3, and the camera CAM_A may represent a camera in the camera 550-1, 550-2, and 550-3 corresponding to this specific panoramic map. In another example, the panoramic map Panorama_B may represent another panoramic map within the panoramic maps Panorama_1, Panorama_2, and Panorama_3, and the camera CAM_B may represent the camera in the cameras 550-1, 550-2, and 550-3 corresponding to this panoramic map.

Specifically, in the overlapping area of the panoramic map Panorama_A and Panorama_B, the control circuit 110 may capture a portion of each of the two panoramic maps as the contents of the overlapping area. The vertical dotted line in lower right corner of FIG. 6 may represent the boundary line between the regions Region_A and Region_B of the panoramic maps Panorama_A and Panorama_B, respectively, wherein the contents of the panoramic map at the left side of the dotted line may be obtained from the panoramic map Panorama_A, and the contents of the panoramic map at the right side of the dotted line may be obtained from the panoramic map Panorama_B. For better understanding, the detailed implementations of the panoramic map combining method are described as follows.

As shown in the upper half of FIG. 6, if a person places a yellow sphere y1 (which is depicted as a small circle) directly below the camera CAM_B, this person may aim the yellow sphere y1 with the camera CAM_A according to the image captured by the camera CAM_A, to obtain the angle θyellow. Assuming that the installation heights h of the cameras CAM_A and CAM_B and the maximum tilting angle θmax of the camera CAM_A (particularly each of the cameras 550-1, 550-2, and 550-3) are given, the horizontal distance k between the cameras CAM_A and CAM_B and the angles θa and θb in the physical space shown in the lower left corner of FIG. 6 can be obtained, wherein the centres A and B correspond to the cameras CAM_A and CAM_B, respectively. As shown in the lower half of FIG. 6, through polar translation, the relative positions of the cameras CAM_A and CAM_B on the panoramic maps Panorama_B and panoramic map Panorama_A can be obtained. The previous centres A and B are now renamed A' and B' after being polar translated, wherein the centres A' and B' correspond to the cameras CAM_A and CAM_B, respectively. The detailed descriptions associated with the polar translation are as follows.

In the lower left corner of FIG. 6, assuming that the symbol "r" is the distance between a point Prθ in the physical space and a centre (e.g. the centre A or the centre B), and the symbol "θ" represents an angle, the pan radius (PR) space may be expressed in polar coordinates as follows:

$$P_{r\theta}=(r*\cos(\theta),r*\sin(\theta));$$

Since the installation height h is known, a point $P_{r\theta}'$ in the pan tilt (PT) space corresponding to the point $P_{r\theta}$ can be expressed as follows:

$$P_{r\theta}'=(\tan-1(r/h)*\cos(\theta),\tan-1(r/h)*\sin(\theta));$$

In the lower right corner of FIG. 6, assuming that the symbols "Ra" and "Rb" represent the radius of the regions Region_A and Region_B, respectively, the spatial distance D (A', B') between the centres A' and B' may be expressed as follows:

$$D(A',B')=\tan-1(Ra/h)*\cos(\theta a)+\tan-1(Rb/h)*\cos(\theta b);$$

Note that this is merely for illustrative purposes, and not meant to be limitations of the present invention.

Figure 7:
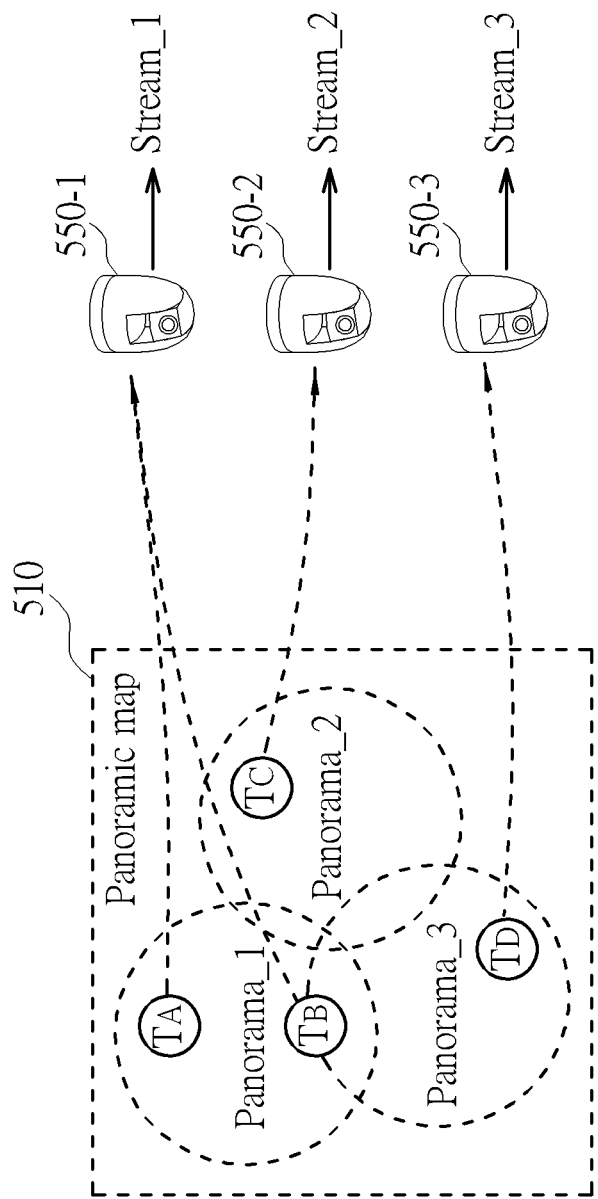
FIG. 7 is a diagram illustrating a target point mapping scheme performed by the method shown in FIG. 2 in an embodiment.

FIG. 7 is a diagram illustrating a target point mapping scheme performed by the method 200 shown in FIG. 2 in an embodiment. According to the panoramic map combining method, the control circuit 110 may correctly map any target point (e.g. any of the target points $T_A$, $T_B$, $T_C$ or $T_D$) onto a corresponding camera. For example, the control circuit 110 may map the target point $T_A$ onto the camera 550-1, to obtain the data flow Stream_1 of images of the camera 550-1. In another example, the control circuit 110 may map the target point $T_B$ onto the camera 550-1, to obtain the data flow Stream_1 of images of the camera 550-1. In another example, the control circuit 110 may map the target point $T_C$ onto the camera 550-2, to obtain the data flow Stream_2 of images of the camera 550-2. In yet another example, the control circuit 110 may map the target point $T_B$ onto the camera 550-3, to obtain the data flow Stream_3 of images of the camera 550-3. Note that the target point $T_B$ is located at the intersecting edge of the panoramic maps Panorama_1 and Panorama_3. Considering that the target point $T_B$ is closer to the centre of the panoramic map Panorama_1, the target point $T_B$ is arranged to be mapped onto the camera 550-1 to obtain images of the camera 550-1. The control circuit 110 may adopt other algorithms to determine which target point (or a patrol node) should be allocated to which camera. Specifically, when some target points (or patrol nodes) are located at blind angles of a camera (e.g. when there is a pillar or a wall blocking the camera, the control circuit 110 will skip allocating the target points (or patrol nodes) to the camera.

Since any point on the panoramic map may directly correspond to a specific pan-tilting coordinate (p, t) which represents the capturing direction of the specific camera, the camera 150 may refer to the patrol route to automatically perform periodic patrol operations by adopting any of the following methods: arbitrary draw, Bezier curve, and so on, to determine (or label) a patrol route such as the target patrol route mentioned in step 220, in order to obtain images corresponding to this patrol route.

According to some embodiments, such as those shown in FIGS. 8-13, the target patrol route may be a station-based patrol line, wherein after the user sets some target points such as patrol nodes, the control circuit 110 may automatically connect the target points to generate the target patrol route. For example, the user interface provided by the control circuit 110 allows the user to perform various operations to determine the target patrol route. In practice, the example of the user input in step 220 may include (but is not limited to) the operations of clicking, dragging node, dragging line, and dragging node out, wherein the control circuit 110 may add, move, insert or delete one or multiple target points (e.g. one or multiple patrol nodes) corresponding to the user input. Specifically, the control circuit 110 may label the current patrol location of one camera on the panoramic map, which represents the location (or the direction) the centre point of this camera currently faces. Note that these embodiment can be implemented successfully no matter whether the panoramic map mentioned in step 210 includes one single panoramic map (e.g. panoramic map 310) or multiple partial panoramic maps (e.g. the panoramic maps Panorama_1, Panorama_2, and Panorama_3).

Figure 8:
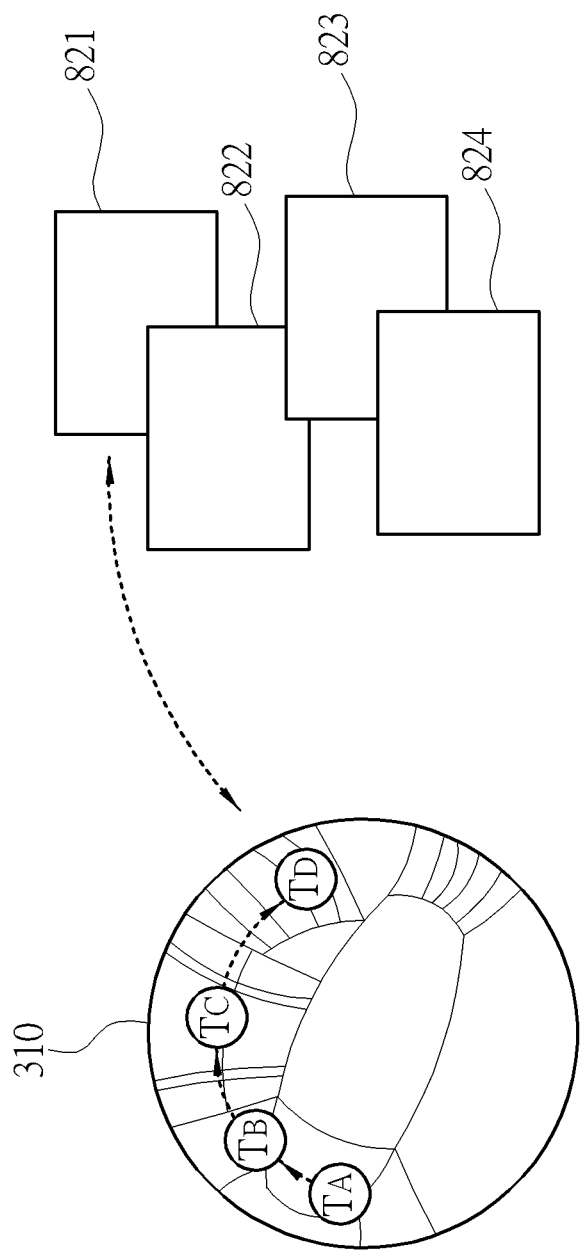
FIG. 8 is a diagram illustrating a method for adding a patrol node performed by the method shown in FIG. 2 in an embodiment.

FIG. 8 is a diagram illustrating a method for adding a patrol node performed by the method 200 shown in FIG. 2 in an embodiment. The user may roughly click some target points (e.g. the target pints $T_A$, $T_B$, $T_C$, and $T_D$) on the panoramic map 310 to add some patrol nodes for a desired patrol route, wherein the control circuit 110 may automatically connect these target points to instantly generate or update the patrol route and obtain normal images captured along corresponding directions, such as the images 821, 822, 823, 824 of the target points $T_A$, $T_B$, $T_C$, and $T_D$, for the user's reference. For example, if the user initially clicks the target points $T_A$ and $T_B$, a curve formed between the target points $T_A$ and $T_B$ will be automatically shown on the screen. Then, if the user clicks the target point $T_C$, a curve formed between the target points $T_B$ and $T_C$ will be automatically shown on the screen. Next, if the user clicks the target point $T_D$, a curve formed between the target points $T_C$ and $T_D$ will be automatically shown on the screen. In this way, a latest version of the target patrol route may include the target points $T_A$, $T_B$, $T_C$, and $T_D$ (sequentially arranged in accordance with the patrol priority).

Figure 9:
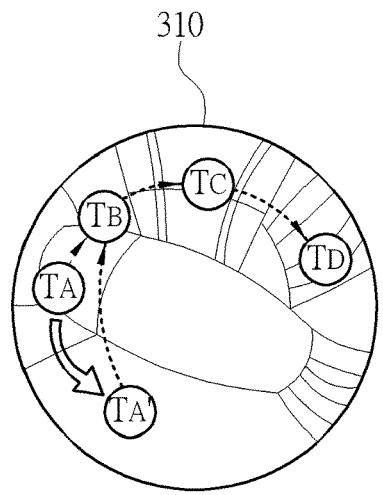
FIG. 9 is a diagram illustrating a method for adjusting a patrol node performed by the method shown in FIG. 2 in another embodiment.

FIG. 9 is a diagram illustrating a method for adjusting a patrol node performed by the method 200 shown in FIG. 2. The user may refer to the desired location on the panoramic map 310 to arbitrarily drag any existing target point on the panoramic map 310, such as the target point $T_A$, to adjust patrol nodes, wherein the control circuit 110 may automatically connect the latest target point to instantly update the target patrol route. For example, if the user drags the target point $T_A$ to the location of the target point $T_A'$, the curve between the target points $T_A$ and $T_B$ will be automatically moved in order to match the target point $T_A'$. Hence, the latest version of the target patrol route may include the target points $T_A'$, $T_B$, $T_C$, and $T_D$ (sequentially arranged in accordance with the patrol priority).

Figure 10:
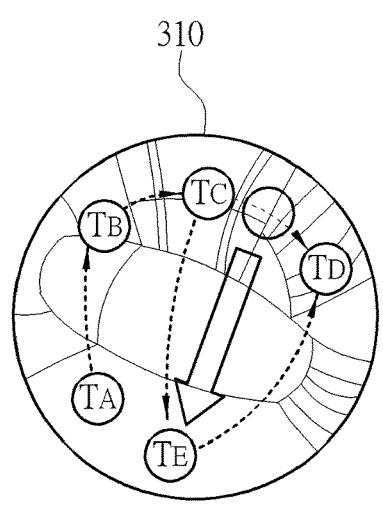
FIG. 10 is a diagram illustrating a method for inserting a patrol node performed by the method shown in FIG. 2 in another embodiment.

FIG. 10 is a diagram illustrating a method for inserting a patrol node performed by the method 200 shown in FIG. 2 in another embodiment. The user may refer to the desired patrol locations on the panoramic map 310, to arbitrarily drag the a local curve formed between two target points on the patrol route, so as to insert a new target point, such as the target point $T_E$, for adjusting patrol nodes. During the time the user drags the local curve, the control circuit 110 may instantly update the target patrol route, making the local curve move or change shape with the dragged point. For example, the user may drag the curve between target point $T_C$ and $T_B$, and more particularly, drag one point on this curve to the target point $T_E$. The curve between the target points $T_C$ and $T_B$ will be automatically moved in accordance with the adjusted target point. Hence, the latest version of the target patrol route will include the target points $T_A$, $T_B$, $T_C$, and $T_D$ (sequentially arranged in accordance with the patrol priority).

Figure 11:
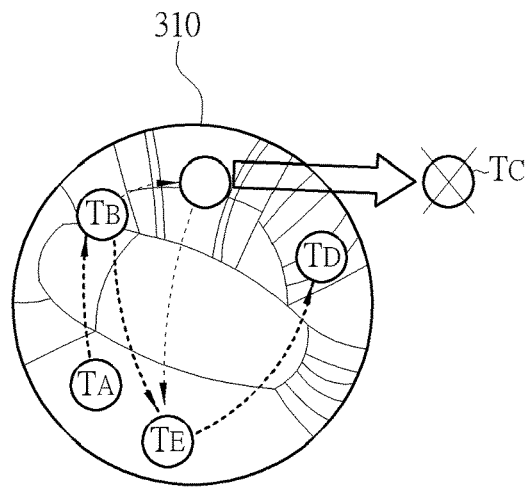
FIG. 11 is a diagram illustrating a method for deleting a patrol node performed by the method shown in FIG. 2 in another embodiment.

FIG. 11 is a diagram illustrating a method 200 for deleting a patrol node performed by the method shown in FIG. 2 according to another embodiment of the present invention. The user may arbitrarily delete any existing target point from the panoramic map 310 according to desired patrol locations on the panoramic map 310, such as the target point $T_C$, to adjust patrol nodes, wherein the control circuit 110 may automatically connect neighboring target points (i.e. the remaining target points near the location of the deleted target point) to instantly update the target patrol route. For example, the user may drag out the target point $T_C$ drag, and more particularly, drag the target point $T_C$ out of the panoramic map 310. The curve between the target points $T_B$ and $T_C$ and the curve between the target points $T_C$ and $T_E$ will be automatically moved in accordance with the adjusted target point. Hence, the latest version of the target patrol route will include the target points $T_A$, $T_B$, $T_E$, and $T_D$ (sequentially arranged in accordance with the patrol priority).

Figure 12:
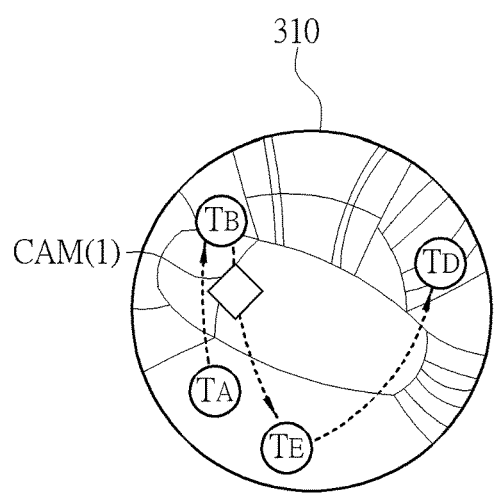
FIG. 12 is a diagram illustrating a patrol progress monitoring scheme performed by the method shown in FIG. 2 according to an embodiment of the present invention.
Figure 13:
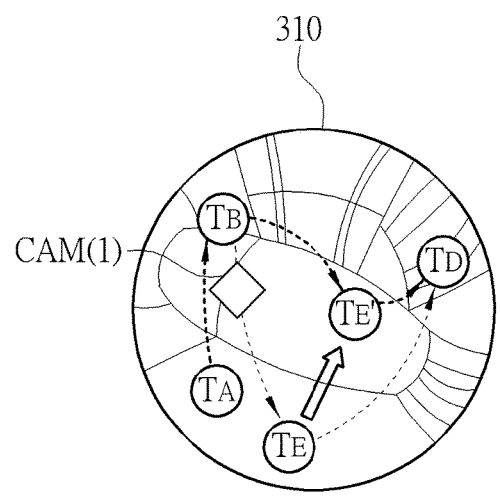
FIG. 13 is a diagram illustrating details of the patrol progress monitoring scheme shown in FIG. 14 according to an embodiment of the present invention.

FIG. 12 is a diagram illustrating a patrol progress monitoring scheme performed by the method 200 shown in FIG. 2 according to an embodiment of the present invention, and FIG. 13 is a diagram illustrating details of the patrol progress monitoring scheme. The user may instantly check the current patrol location of the camera 150, i.e. the location (or direction) the centre point of the camera 150 currently faces. As shown in FIG. 12, after the camera 150 start to perform periodic patrol operations according to the latest version of the target patrol route, the control circuit 110 may instantly label the latest patrol location of the camera, such as the latest location (or direction) the center point of the camera faces, as indicated by the camera symbol CAM (1).

As shown in FIG. 13, when the user changes the target patrol route, the control circuit 110 may instantly control the camera 150 to perform periodic patrol operations according to the latest version of the target patrol route. For example, if the user drags the target point $T_E$ to the target point TE', the curve between the target points TB and TE will be automatically moved in accordance with the adjusted target point. Hence, the latest version of the target patrol route may include the target points $T_A$, $T_B$, $T_E'$, and $T_D$ (sequentially arranged in accordance with the patrol priority), and the control circuit 110 will control the camera indicated by the camera symbol CAM (1) to turn, making this camera match the latest version of the target patrol route, wherein the control circuit 110 may instantly label the latest patrol location of this camera.

Figure 14:
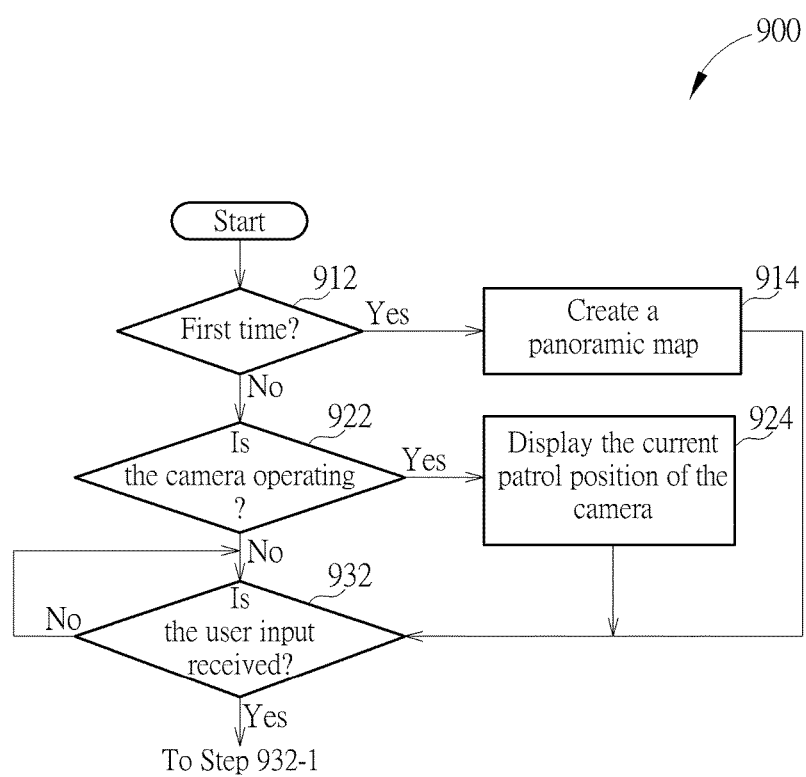
FIG. 14 is a diagram illustrating a partial operation of a work flow performed by the method shown in FIG. 2 according to an embodiment of the present invention.
Figure 15:
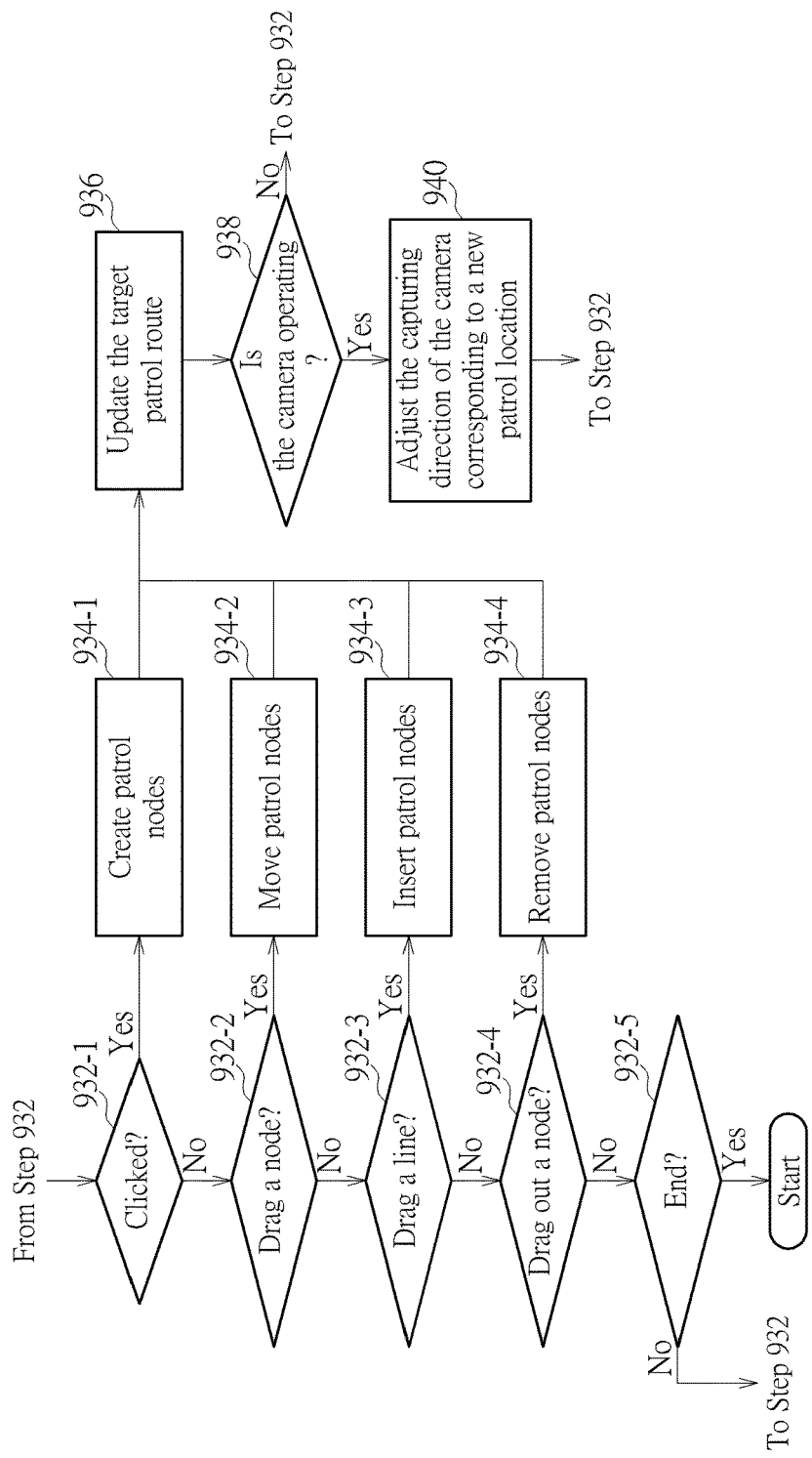
FIG. 15 is a diagram illustrating another partial operation of the work flow performed by the method shown in FIG. 2 according to an embodiment of the present invention.

FIG. 14 is a diagram illustrating a partial operation of a work flow 900 performed by the method 200 shown in FIG. 2 according to an embodiment of the present invention, and FIG. 15 is a diagram illustrating another partial operation of the work flow 900. In step 912, the control circuit 110 checks whether the apparatus 100 performs the work flow 900 for the first time (e.g. the very first time after the central control device 105 leaves the factory or after going back to a default state). If yes, the flow goes to step 914; otherwise, the flow goes to step 922.

In step 914, the control circuit 110 creates the panoramic map.

In step 922, the control circuit 110 checks whether the camera 150 is operating. If yes, the flow goes to step 924; otherwise, the flow goes to step 932.

In step 924, the control circuit 110 shows the current patrol locations of the camera, and more particularly, labels the current location (or direction) of the centre point of the camera 150 faces on the panoramic map.

In step 932, the control circuit 110 checks whether the user input is received. If yes, the flow goes to step 932-1; otherwise, the flow goes to step 932 again to wait for the user input.

In step 932-1, the control circuit 110 checks whether the latest user input is clicked, as illustrated by the operation of clicking the target point in FIG. 8. If yes, the flow goes to step 934-1; otherwise, the flow goes to step 932-2.

In step 932-2, the control circuit 110 checks whether the latest user input is dragging a node, as illustrated by the operation of dragging target points shown in FIG. 9. If yes, the flow goes to step 934-2; otherwise, the flow goes to step 932-3.

In step 932-3, the control circuit 110 checks whether the latest user input is dragging a line, as illustrated by the operation of dragging a line between the target points shown in the embodiment of FIG. 10. If yes, the flow goes to step 934-3; otherwise, the flow goes to step 932-4.

In step 932-4, the control circuit 110 checks whether the latest user input is dragging out a node, as illustrated by the operation of dragging target points outside the panoramic map 310 shown in FIG. 11. If yes, the flow goes to step 934-4; otherwise, the flow goes to step 932-5.

In step 932-5, the control circuit 110 checks if the flow should be ended. For example, the user may press a specific key such as "End" in order to indicate that she wishes to end the settings of the target patrol route. In this case, the work flow 900 will be ended; otherwise, the flow goes to step 932 again.

In step 934-1, the control circuit 110 creates the patrol nodes. For example, the control circuit 110 may create patrol nodes according to the patrol node creating method.

In step 934-2, the control circuit 110 moves the patrol nodes. For example, the control circuit 110 may move the patrol nodes according to the patrol node adjusting method.

In step 934-3, the control circuit 110 inserts patrol nodes. For example, the control circuit 110 may insert patrol modes according to the patrol node inserting method.

In step 934-4, the control circuit 110 removes the patrol nodes. For example, the control circuit 110 may remove the patrol nodes according to the patrol node deleting method.

In step 936, the control circuit 110 updates the target patrol route.

In step 938, the control circuit 110 checks whether the camera 150 is operating. If yes, the flow goes to step 940; otherwise, the flow goes to step 932 again.

In step 940, the control circuit 110 adjusts the capturing direction of the camera 150 corresponding to a new patrol location, i.e. the new location (direction) the centre point of the camera 150 faces.

According to this embodiment, since the method 200 provides an operating environment based on the panoramic map, the user may freely set patrol nodes required for determining the target patrol route. The features in this embodiment which are similar to those in previous embodiments are omitted here for brevity.

According to some embodiments, after the user clicks the target points (e.g. patrol nodes), the control circuit 110 may automatically plan a shortest patrol route through some calculations, and utilize the shortest patrol route as the target patrol route, wherein examples of methods for calculating the shortest patrol route may include (but are not limited to): the brute force method, branch-and-bound method, dynamic programming and nearest-neighbor method, as well as prior arts associated with the traveling salesman problem.

In practice, the shortest patrol route may be planed according to the rotating ability of the camera 150. For example, some cameras may have a smallest step limit when performing panning or tilting operations, or cannot simultaneously perform these operations. Since the control circuit 110 may plan the shortest patrol route according to the ratability of the camera 150, zigzag movements caused by inappropriate patrol routes can be avoided.

Cameras of various brands may communicate to each other through various application program interfaces (APIs). Through the API of the camera 150, the control circuit 110 may inquire parameters of the camera 150 and/or control the functions of the camera 150, in order to obtain parameters associated with the rotating abilities of the camera 150, such as parameters associated with the smallest step limit of the aforementioned panning or tilting operations. According to some embodiments, the control circuit 110 may inquire parameters associated with the rotating ability of the camera 150 according to methods specified in the open network video interface forum (ONVIF).

Detailed implementations of generating the aforementioned at least one panoramic map may include, for example, the control circuit 110 generating converted images by performing coordinate conversion upon images captured by the camera in various directions, and combining the converted images to generate the panoramic map. According to some embodiments, the control circuit 110 may directly utilize a fish eye camera to capture images to generate at least one fish eye diagram as the aforementioned panoramic map. The user interface provided by the control circuit 110 may include two windows such as a left side window and a right side window, and may utilize the left side window and the right side window to display images captured by the fish eye camera and the camera 150, respectively.

Figure 16:
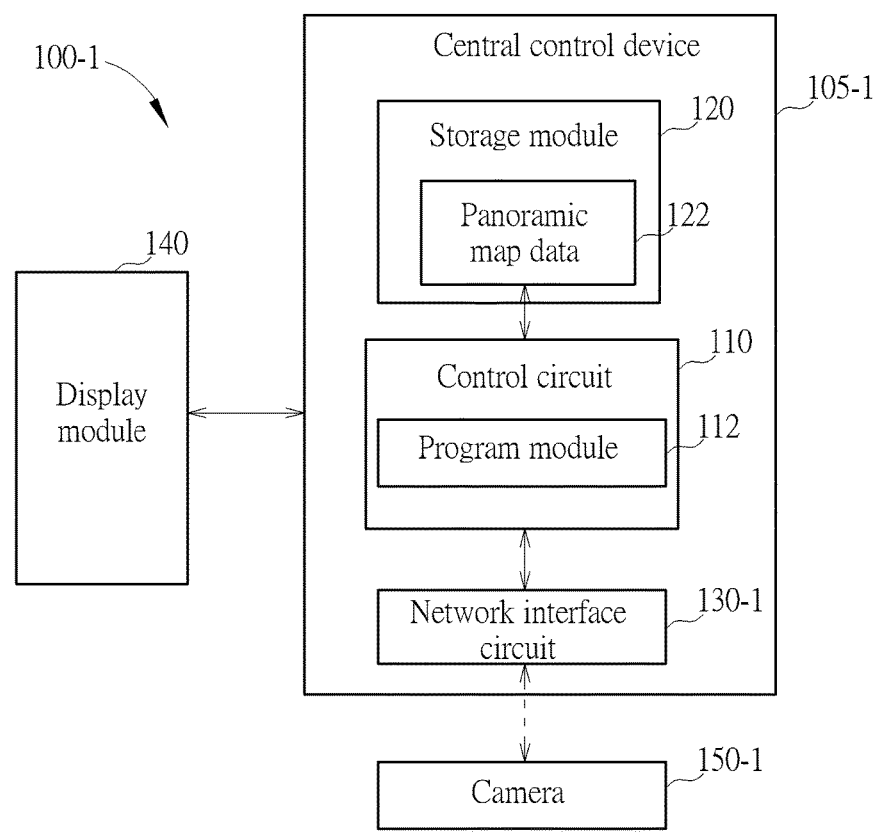
FIG. 16 is a diagram illustrating an apparatus for managing a surveillance system according to another embodiment of the present invention.

FIG. 16 is a diagram illustrating an apparatus 100-1 for managing a surveillance system according to another embodiment of the present invention, wherein the method 200 shown in FIG. 2 (and modifications thereof) may also be applied to the apparatus 100-1 shown in FIG. 16, or applied to the central control device 105-1 (particularly the control circuit 110 therein). Compared with the embodiment shown in FIG. 1, the interface circuit 130 is replaced with another interface circuit (i.e. the network interface circuit 130-1), and the camera 150 is replaced with the camera 150-1 in this embodiment. According to this embodiment, the camera 150-1 may communicate through the internet. For example, the camera, particularly one or multiple PTZ cameras, may be internet protocol (IP) cameras. In practice, as long as the camera 150-1 is connected to the internet, information can be transmitted to the central control device 105-1. The features in this embodiment similar to those mentioned in previous embodiments/modifications will not be further described.

One advantage provided by the present invention is that, compared with the related art, the methods and apparatuses of the present invention may greatly reduce the time required for setting configurations of cameras (such as PTZ cameras) by providing the panoramic map to the user, and making these cameras perform precise capturing direction adjusting operations according to the demands of the user. Further, for important areas which demand higher precision for surveillance or patrol routes, the methods and apparatuses of the present invention may greatly reduce the operating time and raise the operation flexibility for the user. They may also avoid problems existing in related arts, such as surveillance gaps caused by spending too much time on adjusting routes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a surveillance system, the surveillance system comprising at least one camera with capability of capturing direction adjustment, the method comprising:
   outputting a panoramic map to a display module of the surveillance system, for displaying the panoramic map on the display module;
   correspondingly labeling a target patrol route of the surveillance system on the panoramic map according to at least one user input of a user of the surveillance system; and
   performing capturing direction adjustment operations on the at least one camera based on the target patrol route;
   wherein the step of correspondingly labeling the target patrol route of the surveillance system on the panoramic map according to the user input of the user of the surveillance system further comprises: instantly controlling the at least one camera to automatically rotate to a specific direction by selecting part of the panoramic map, wherein the least one camera is controlled to obtain a non-distorted image corresponding to the selected part of the panoramic map as a two-dimensional reference image to be shown on the selected part of the panoramic map.

2. The method of claim 1, wherein the step of correspondingly labeling the target patrol route of the surveillance system on the panoramic map according to the user input of the user of the surveillance system further comprises:
   controlling one camera within the at least one camera to instantly face the specific direction according to the user input.

3. The method of claim 2, wherein the step of labeling the target patrol route of the surveillance system on the panoramic map correspondingly according to the user input of the user of the surveillance system further comprises:
   instantly labeling a specific target point on the panoramic map according to the user input, wherein the specific direction and the specific target point correspond to each other; and
   obtaining at least one image corresponding to the specific direction from the camera within the at least one camera, and outputting the image to the display module to allow the user to adjust the target patrol route according to the image.

4. The method of claim 3, wherein the specific target point is generated by dragging an original target point on a temporary version of the target patrol route; and the step of correspondingly labeling the target patrol route of the surveillance system on the panoramic map according to the user input of the user of the surveillance system further comprises:
   instantly adjusting a shape of the target patrol route on the panoramic map according to the specific user input, to make an update version of the target patrol route comprise the specific target point.

5. The method of claim 3, wherein the specific target point is added out of a temporary version of the target patrol route; and the step of labeling the target patrol route of the surveillance system on the panoramic map correspondingly according to the user input of the user of the surveillance system further comprises:
   instantly extending the target patrol route on the panoramic map according to the user input, to make an updated version of the target patrol route comprise the specific target point.

6. The method of claim 1, further comprising:
generating the panoramic map in advance, and storing the panoramic map into a storage module of the surveillance system.

7. The method of claim 6, wherein the step of generating the panoramic map in advance and storing the panoramic map into the storage module of the surveillance system further comprises:
controlling the at least one camera to automatically perform a patrol operation corresponding to a plurality of directions to obtain a plurality of images corresponding to the plurality of directions;
performing coordinate conversion upon the plurality of images, to generate a plurality of converted images corresponding to the plurality of images; and
combining the plurality of converted images according to corresponding locations of the plurality of directions on the panoramic map to generate the panoramic map.

8. The method of claim 1, wherein the panoramic map comprises at least one multi-directional combination picture corresponding to the at least one camera; and each of the multi-directional combination pictures emulates at least a portion of a fish eye diagram.

9. The method of claim 1, wherein the panoramic map comprises at least one fish eye diagram corresponding to the at least one camera; and the at least one fish eye diagram is captured by at least one fish eye camera.

10. An apparatus for managing a surveillance system, the surveillance system comprising at least one camera with a capability of capturing direction adjustment, the apparatus comprising at least a portion of the surveillance system, and comprising:
an interface circuit, configured in a central control device in the surveillance system, and arranged to couple to the at least one camera; and
a control circuit, coupled to the interface circuit and configured in the central control device, and arranged to control the central control device to output a panoramic map to a display module of the surveillance system, for displaying the panoramic map on the display module, wherein the control circuit correspondingly labels a target patrol route of the surveillance system on the panoramic map according to at least one user input of a user of the surveillance system; the control circuit performs capturing direction adjustment operations on the at least one camera based on the target patrol route; and the control circuit instantly controls the at least one camera to automatically rotate to a specific direction by selecting part of the panoramic map, wherein the least one camera is controlled to obtain a non-distorted image corresponding to the selected part of the panoramic map as a two-dimensional reference image to be shown on the selected part of the panoramic map.

11. The apparatus of claim 10, wherein the control circuit controls one camera within the at least one camera to instantly face the specific direction according to the user input.

12. The apparatus of claim 11, wherein the control circuit instantly labels a specific target point on the panoramic map according to the user input, wherein the specific direction and the specific target point correspond to each other; and the control circuit obtains at least one image corresponding to the specific direction from the camera within the at least one camera through the interface circuit, and controls the central control device to output the image to the display module for the display module to display to allow the user to adjust the target patrol route according to the image.

13. The apparatus of claim 12, wherein the specific target point is generated by dragging an original target point on a temporary version of the target patrol route; and the control circuit instantly adjusts a shape of the target patrol route on the panoramic map according to the specific user input to make an updated version of the target patrol route comprise the specific target point.

14. The apparatus of claim 12, wherein the specific target point is added out of a temporary version of the target patrol route; and the control circuit instantly extends the target patrol route on the panoramic map according to the specific user input to make an updated version of the target patrol route comprise the specific target point.

15. The apparatus of claim 10, wherein the control circuit generates the panoramic map in advance, and stores the panoramic map into a storage module of the surveillance system.

16. The apparatus of claim 15, wherein the control circuit controls the at least one camera to automatically perform a patrol operation corresponding to a plurality of directions through the interface circuit to obtain a plurality of images corresponding to the plurality of directions; the control circuit performs coordinate conversion upon the plurality of images to generate a plurality of converted images corresponding to the plurality of images; and the control circuit combines the plurality of converted images according to corresponding locations of the plurality of directions on the panoramic map to generate the panoramic map.

17. The apparatus of claim 10, wherein the panoramic map comprises at least one multi-directional combination picture corresponding to the at least one camera; and each of the at least one multi-directional combination pictures emulates at least a portion of a fish eye diagram.

18. The apparatus of claim 10, wherein the panoramic map comprises at least one fish eye diagram corresponding to the at least one camera; and the at least one fish eye diagram is captured by at least one fish eye camera.

* * * * *